(12) United States Patent
Okazaki

(10) Patent No.: US 11,573,460 B2
(45) Date of Patent: Feb. 7, 2023

(54) LIQUID CRYSTAL DISPLAY DEVICE AND ELECTRONIC APPARATUS

(71) Applicant: SONY CORPORATION, Tokyo (JP)

(72) Inventor: Tsuyoshi Okazaki, Kanagawa (JP)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 17/045,801

(22) PCT Filed: Mar. 19, 2019

(86) PCT No.: PCT/JP2019/011488
§ 371 (c)(1),
(2) Date: Oct. 7, 2020

(87) PCT Pub. No.: WO2019/202897
PCT Pub. Date: Oct. 24, 2019

(65) Prior Publication Data
US 2021/0063788 A1    Mar. 4, 2021

(30) Foreign Application Priority Data
Apr. 16, 2018    (JP) .............................. JP2018-078535

(51) Int. Cl.
| G02F 1/1343 | (2006.01) |
| G02F 1/1337 | (2006.01) |
| G02F 1/1335 | (2006.01) |

(52) U.S. Cl.
CPC ...... *G02F 1/134309* (2013.01); *G02F 1/1337* (2013.01); *G02F 1/133526* (2013.01);
(Continued)

(58) Field of Classification Search
CPC .................. G02F 1/1335; G02F 1/1337; G02F 1/134336; G02F 2203/01; G02F 2203/02;
(Continued)

(56) References Cited

U.S. PATENT DOCUMENTS 6,459,463 B2 * 10/2002 Kim .................. G02F 1/133553
                                                    349/110
6,563,559 B2 *  5/2003 Noritake ........... G02F 1/133553
                                                    349/113
(Continued)

FOREIGN PATENT DOCUMENTS

| CN | 1619362 A    | 5/2005 |
| CN | 106463080 A  | 2/2017 |

(Continued)

OTHER PUBLICATIONS

International Search Report and Written Opinion of PCT Application No. PCT/JP2019/011488, dated Apr. 23, 2019, 08 pages of ISRWO.

*Primary Examiner* — Jia X Pan
(74) *Attorney, Agent, or Firm* — Chip Law Group

(57) ABSTRACT

A liquid crystal display device includes a plurality of pixels, each pixel includes a first electrode, a second electrode opposed to the first electrode, and a liquid crystal layer between the second electrode and the first electrode; a first region in each of the plurality of pixels having a first optical path length between the first electrode and the second electrode; a second region in each of the plurality of pixels having a second optical path length between the first electrode and the second electrode, the second optical path length being shorter than the first optical path length, the second region has the liquid crystal layer equal in thickness to the liquid crystal layer in the first region; and an optical path length adjusting layer between the liquid crystal layer and the first electrode in the first region.

13 Claims, 15 Drawing Sheets

(52) U.S. Cl.
CPC .... *G02F 1/134336* (2013.01); *G02F 2203/01* (2013.01); *G02F 2203/02* (2013.01)

(58) Field of Classification Search
CPC ......... G02F 1/134309; G02F 1/133502; G02F 1/1343; G02F 1/133526; G02F 1/133371
See application file for complete search history.

(56) References Cited

U.S. PATENT DOCUMENTS

| | | | |
|---|---|---|---|
| 2004/0046911 A1* | 3/2004 | McKnight | G02F 1/133553 349/113 |
| 2004/0119901 A1* | 6/2004 | Kang | G02F 1/136227 349/43 |
| 2005/0162591 A1 | 7/2005 | Hashimoto | |
| 2007/0046880 A1 | 3/2007 | Shigeta et al. | |
| 2015/0277187 A1* | 10/2015 | Akasaka | H04N 5/7441 445/24 |
| 2015/0362776 A1* | 12/2015 | Jikumaru | G02F 1/133553 349/12 |
| 2020/0335540 A1* | 10/2020 | Sugizaki | H01L 27/14625 |

FOREIGN PATENT DOCUMENTS

| | | |
|---|---|---|
| EP | 1533650 A1 | 5/2005 |
| JP | 04-097226 A | 3/1992 |
| JP | 2001-311936 A | 11/2001 |
| JP | 2005-156717 A | 6/2005 |
| JP | 2007-293243 A | 11/2007 |
| JP | 2009-020294 A | 1/2009 |
| JP | 2015-118280 A | 6/2015 |
| JP | 2016-027374 A | 2/2016 |
| JP | 2018-078535 A | 5/2018 |
| KR | 10-2017-0018388 A | 2/2017 |
| WO | 2015/189735 A1 | 12/2015 |

* cited by examiner

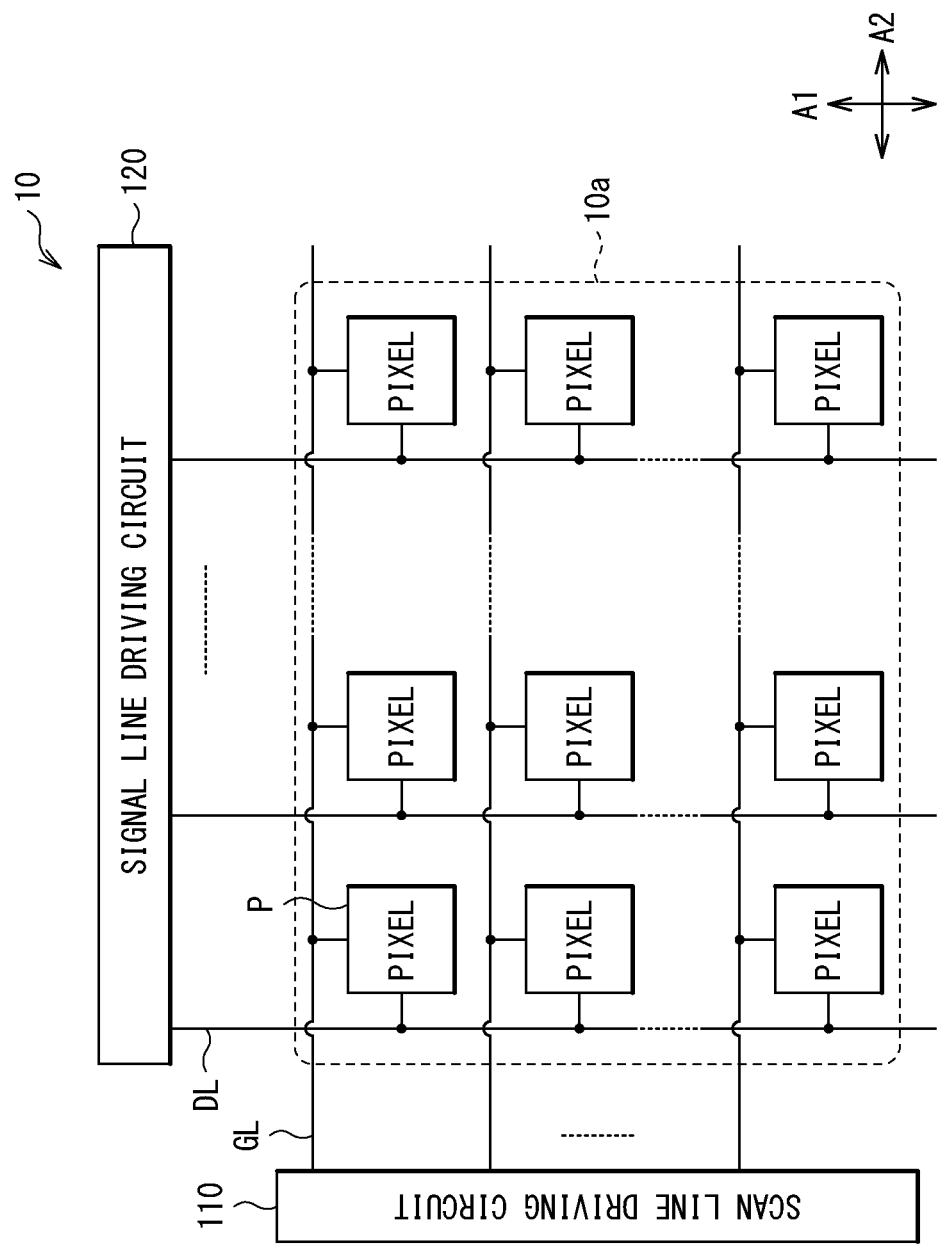
[FIG. 1]

[FIG. 2]
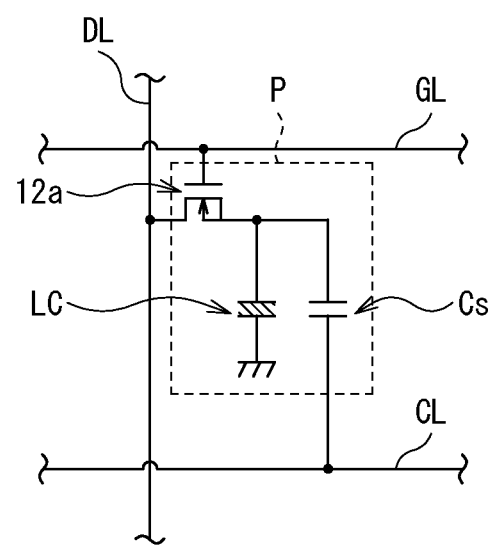

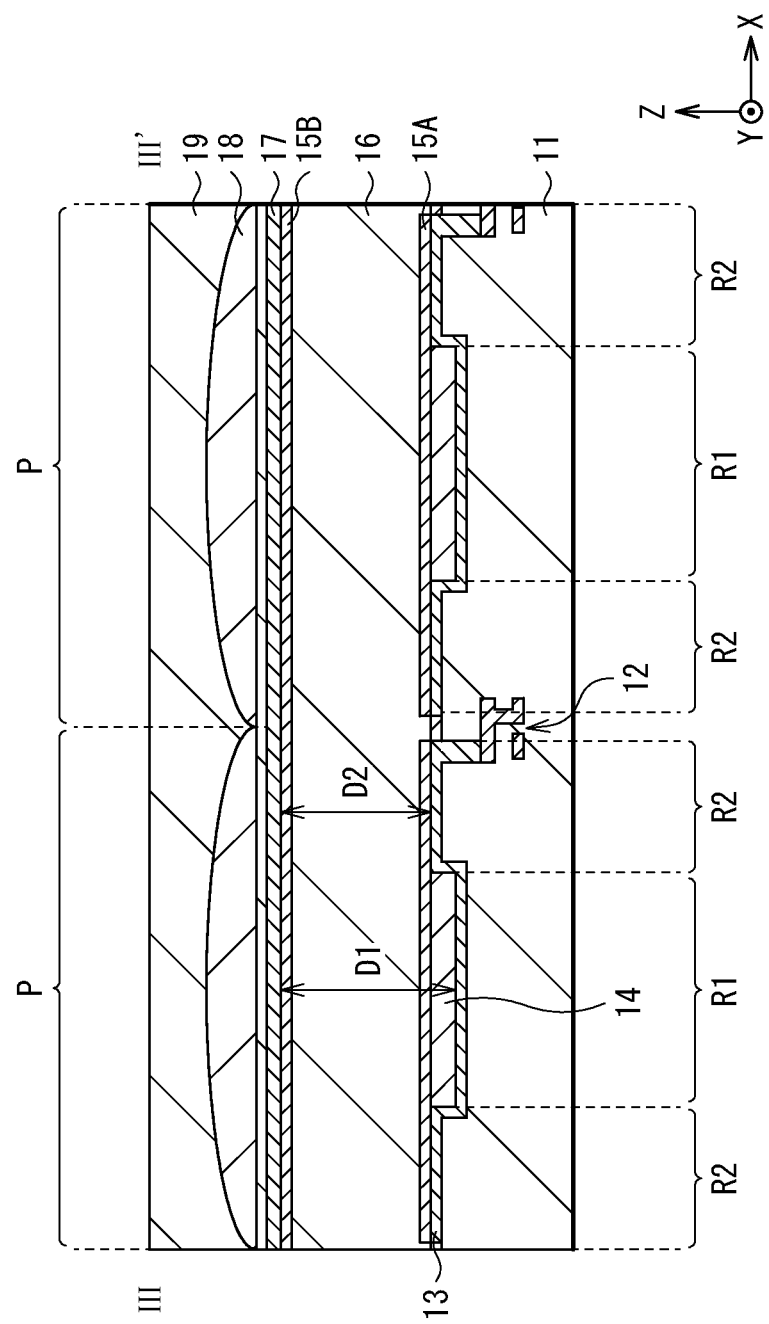

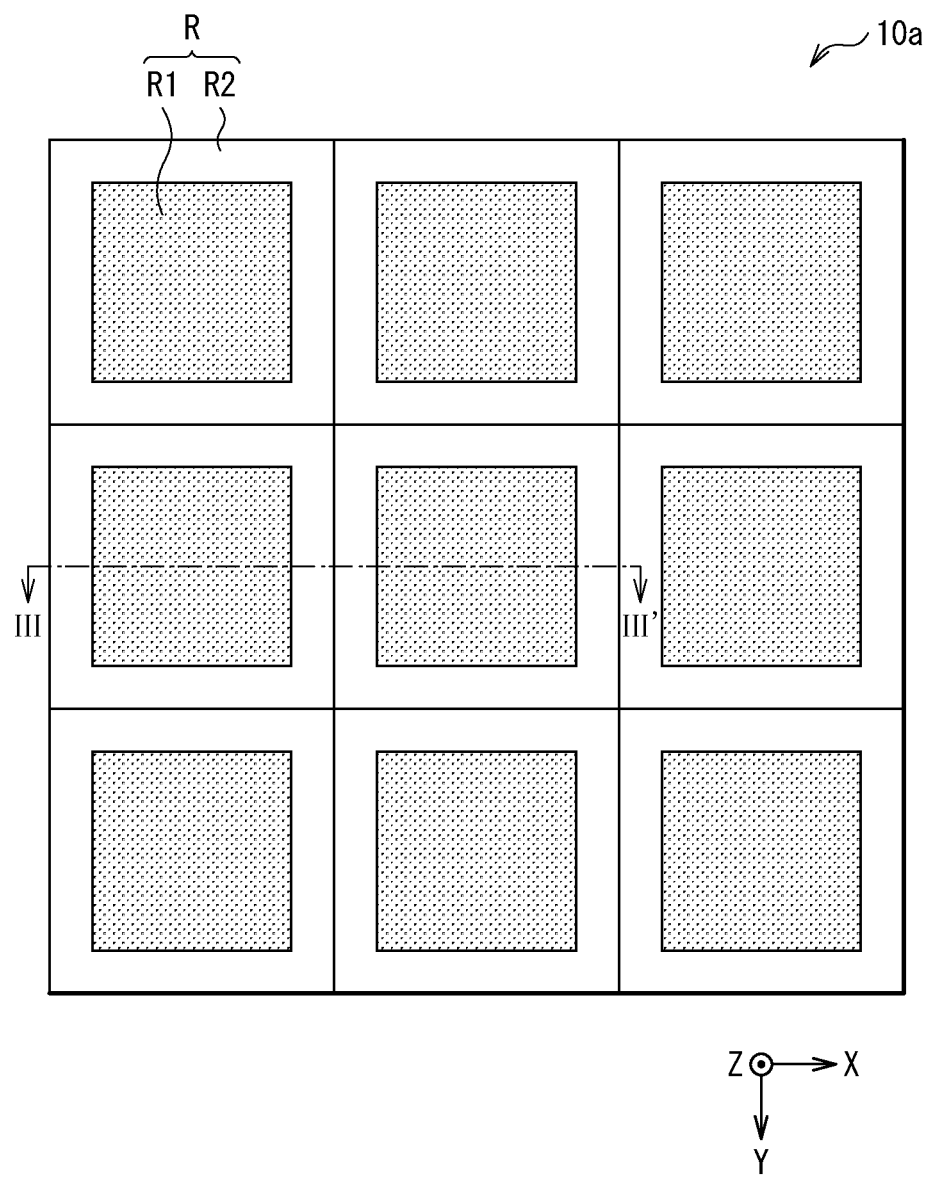

[FIG. 5]
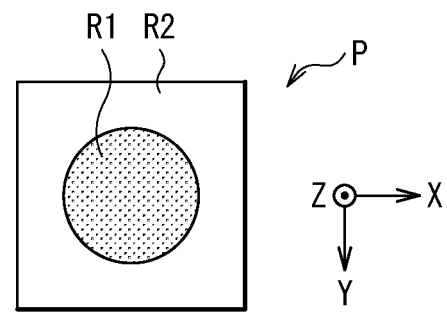
[FIG. 6]
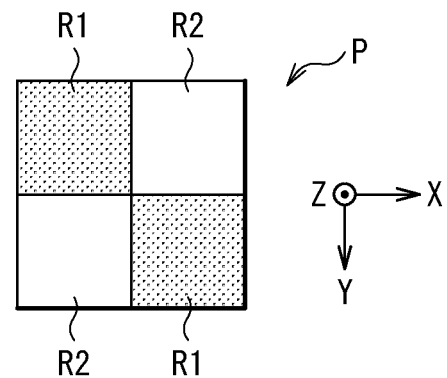
[FIG. 7]
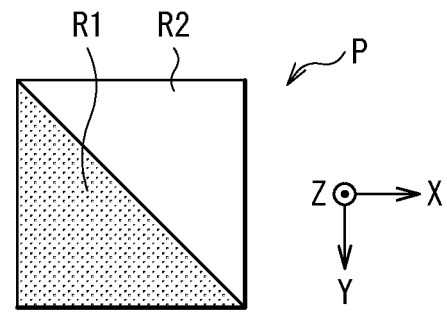

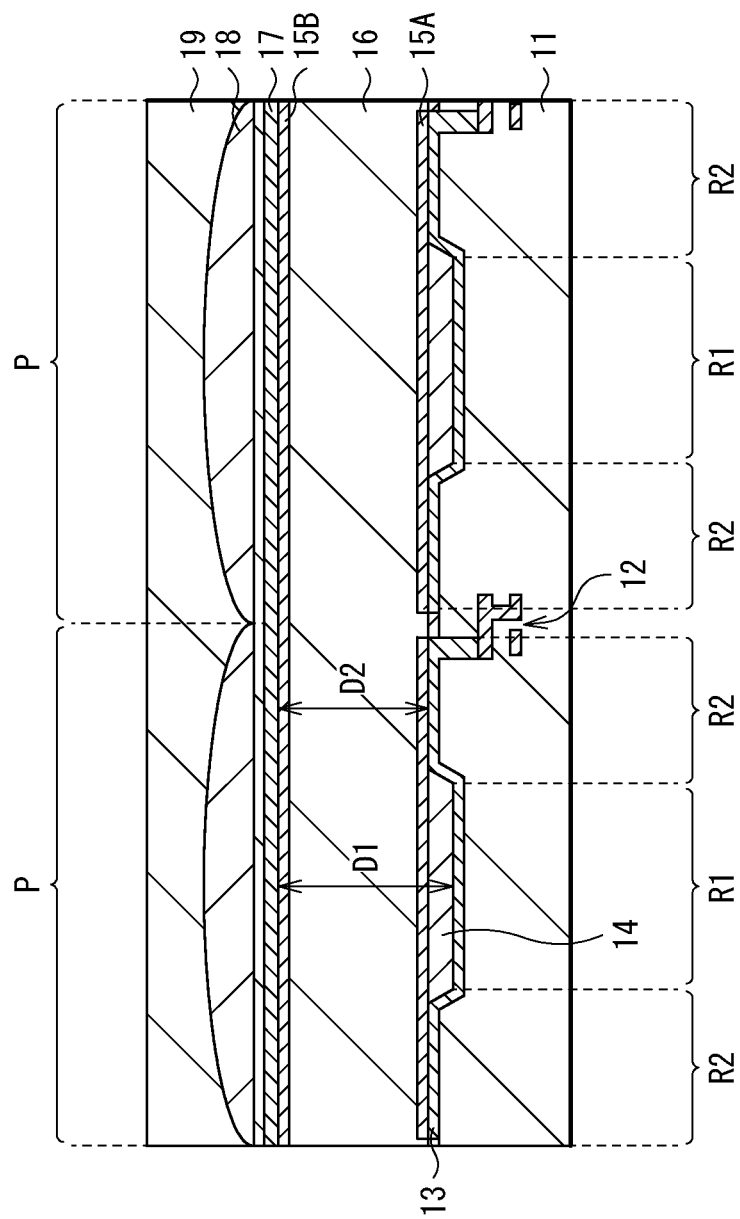
[FIG. 8]

[FIG. 9]
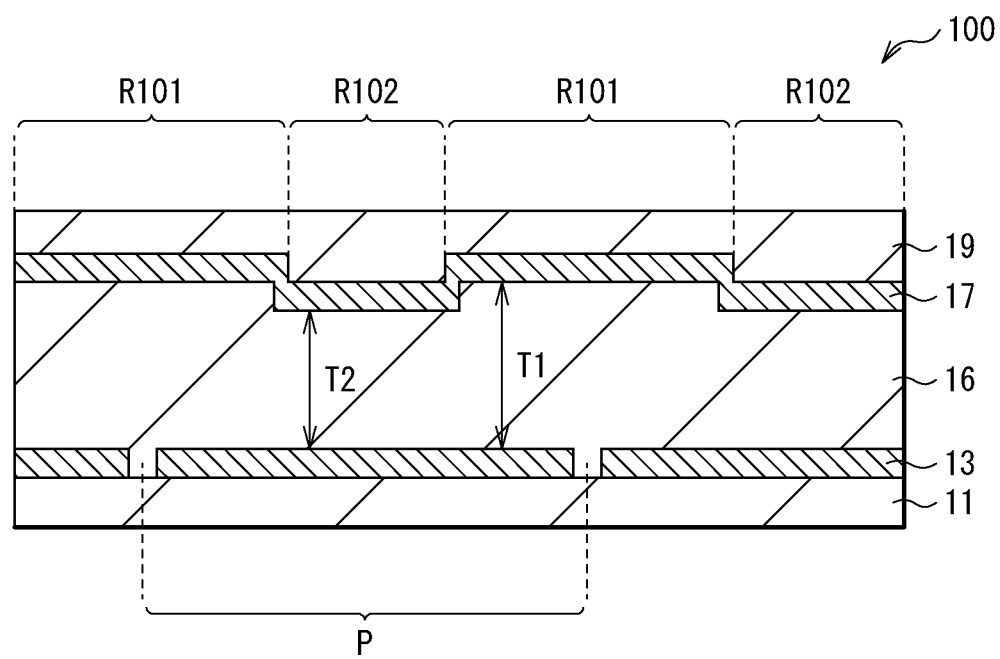
[FIG. 10]
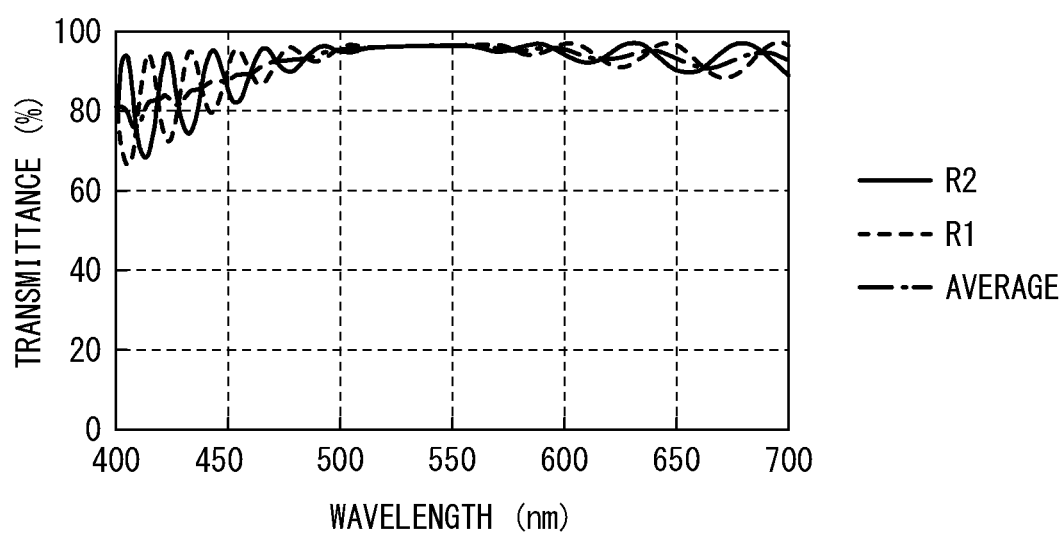

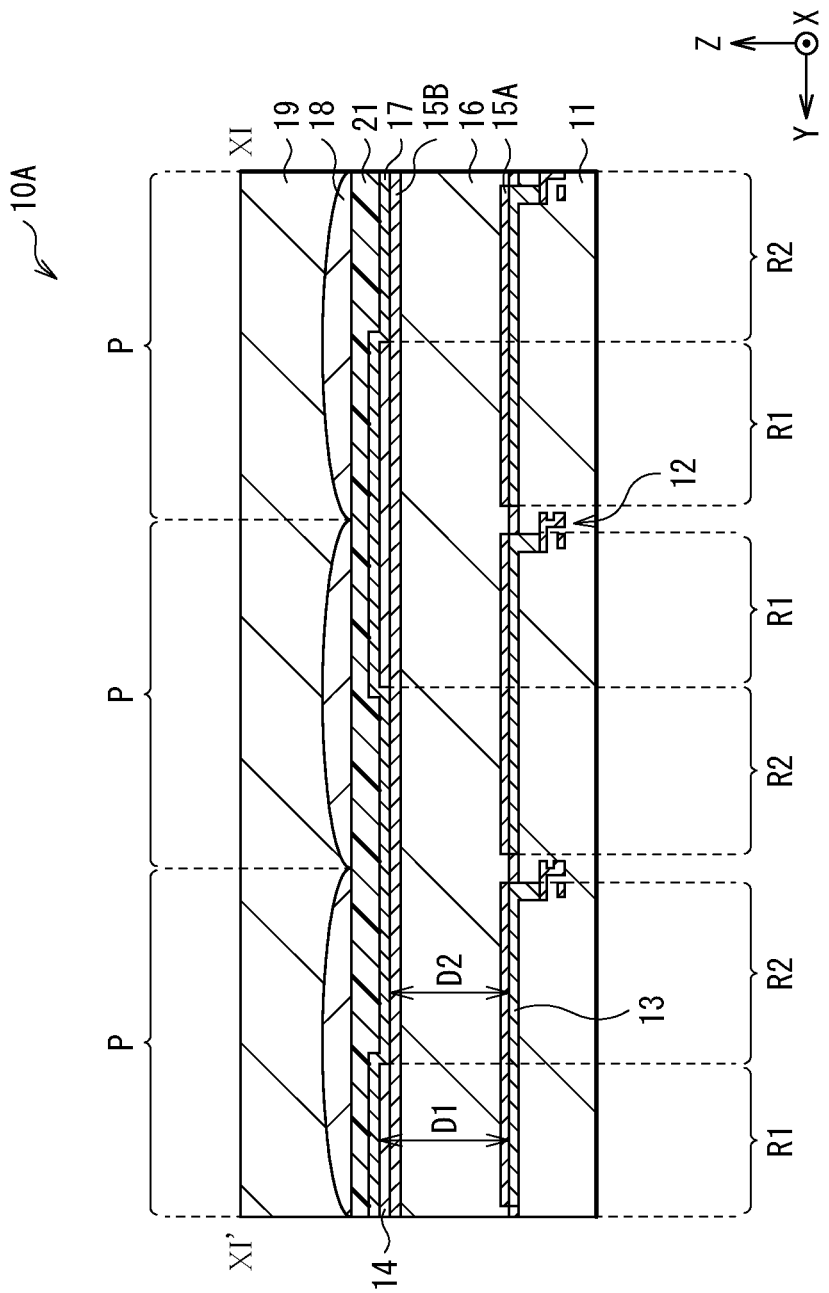
[FIG. 11]

[FIG. 12]
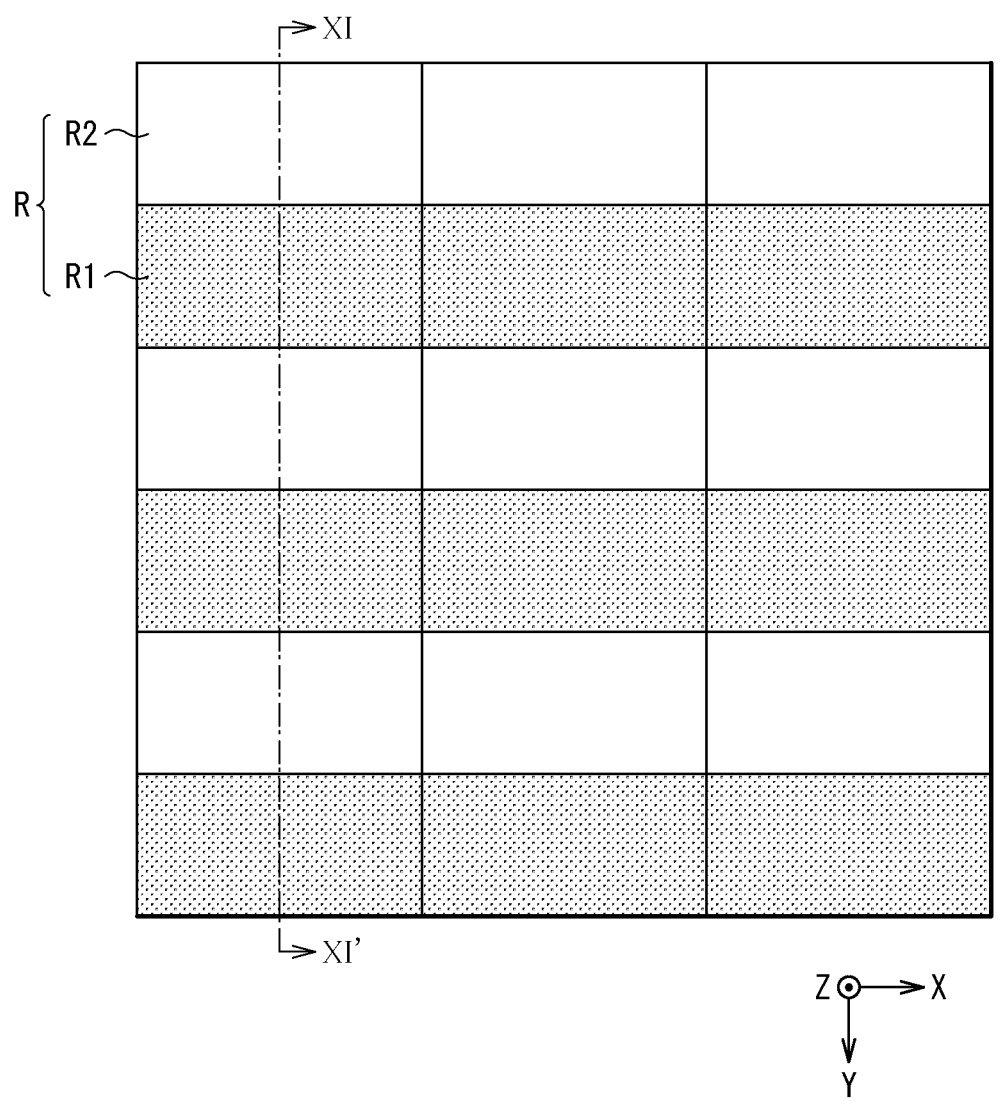

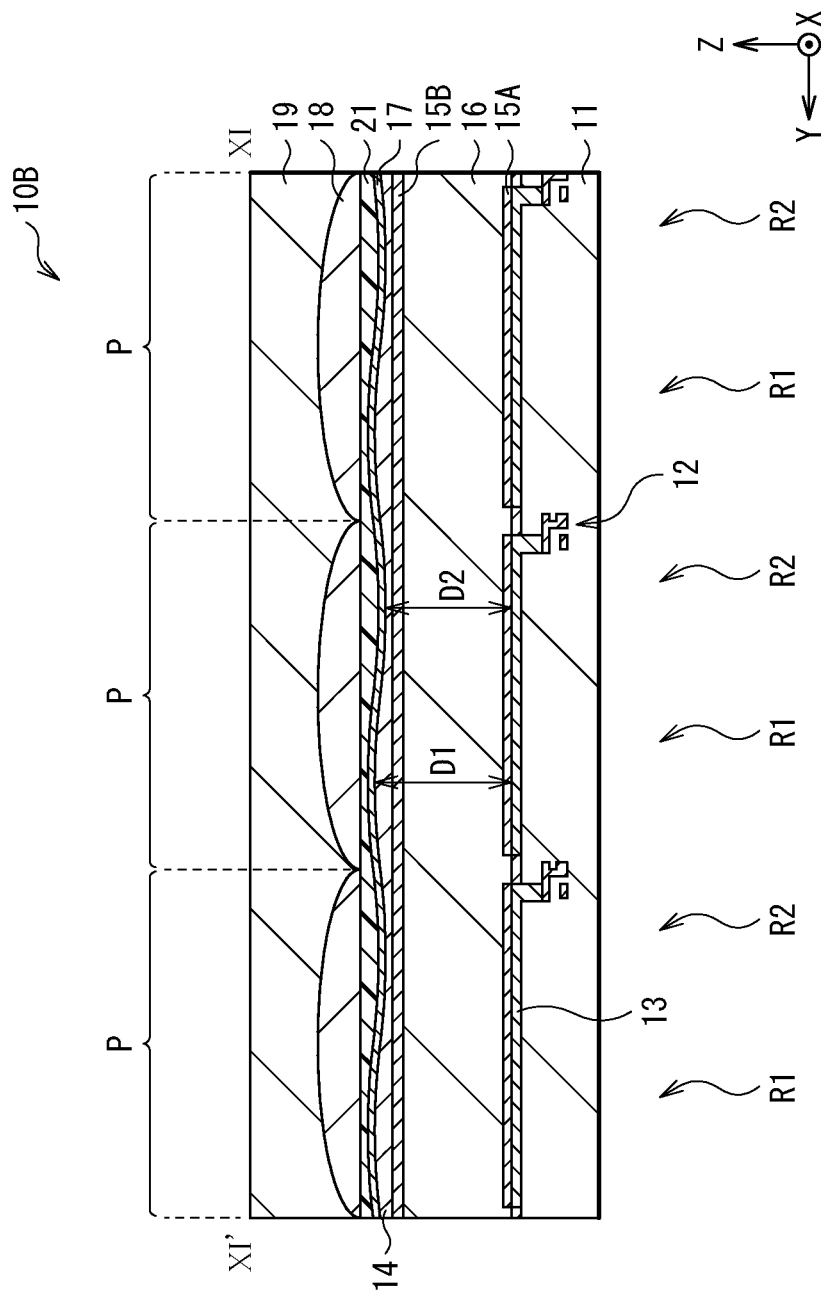
[FIG. 13]

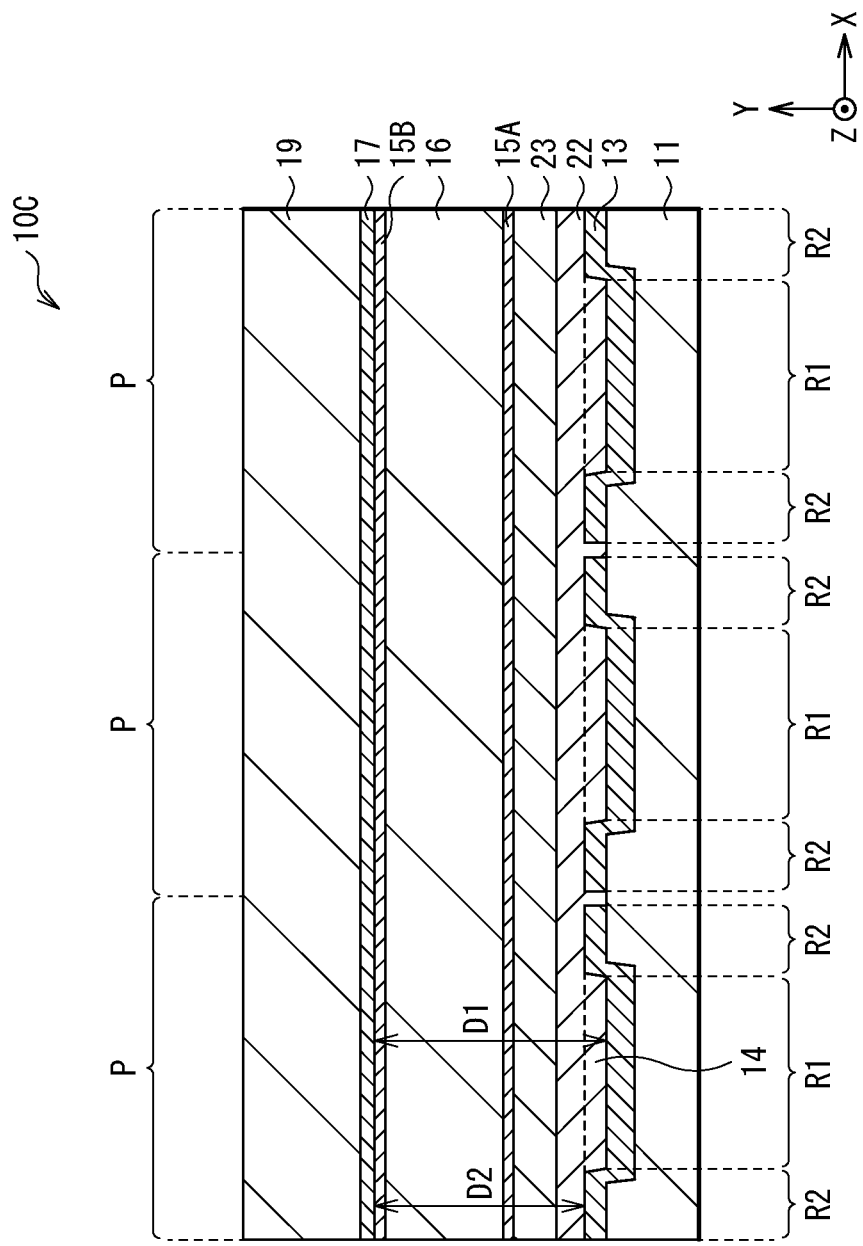
[FIG. 14]

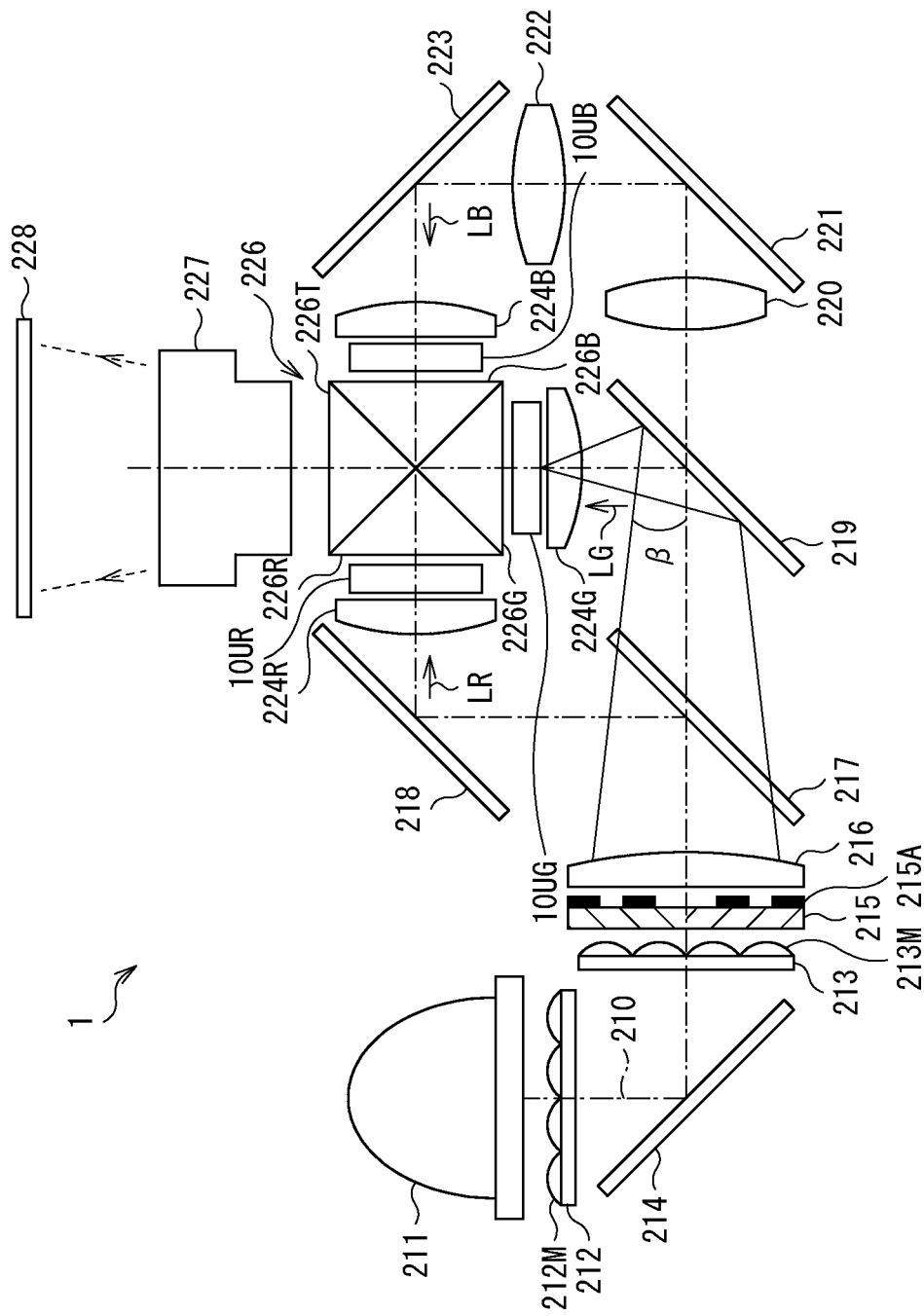
[FIG. 15]

[FIG. 16]
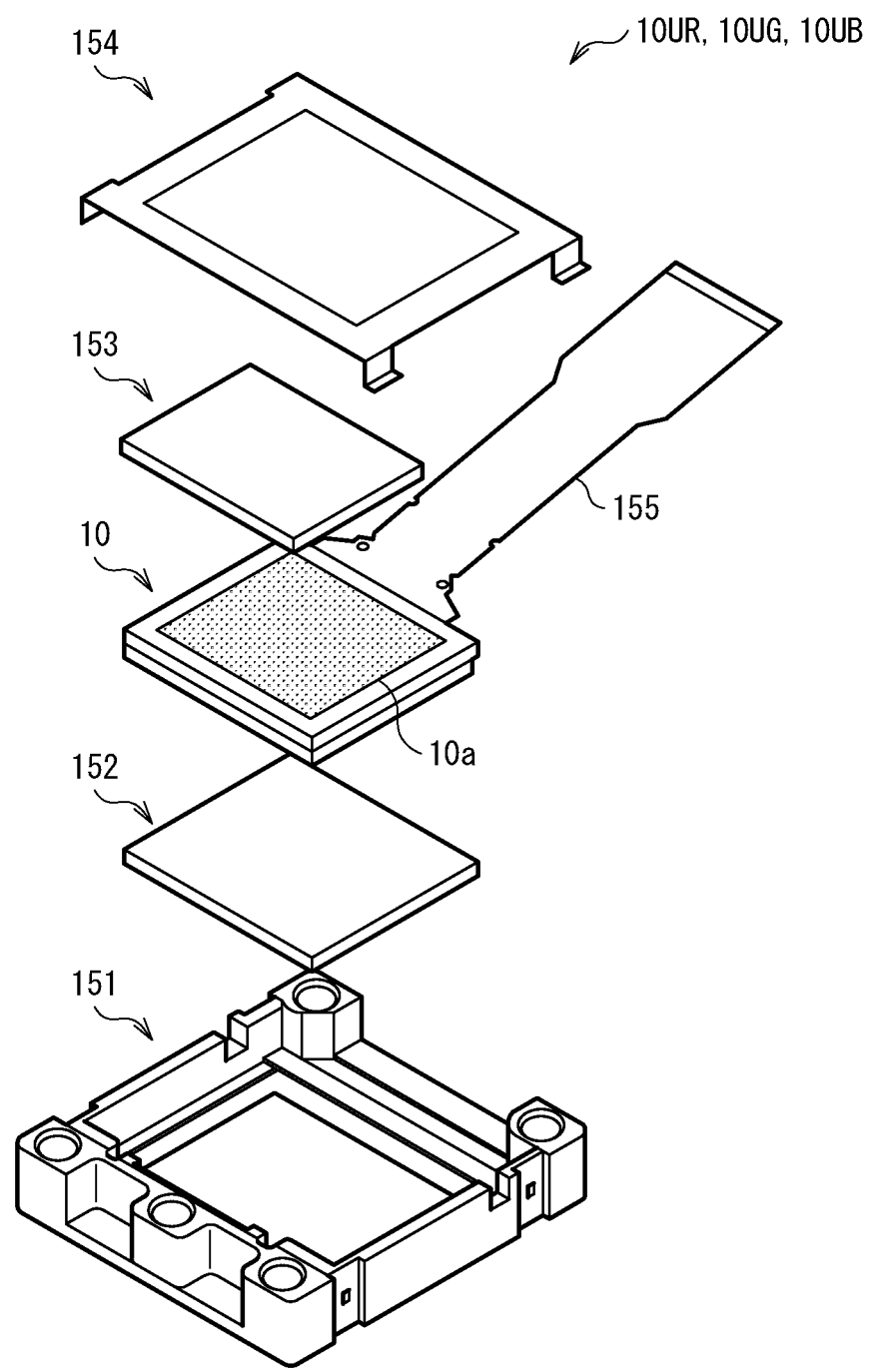

[FIG. 17]
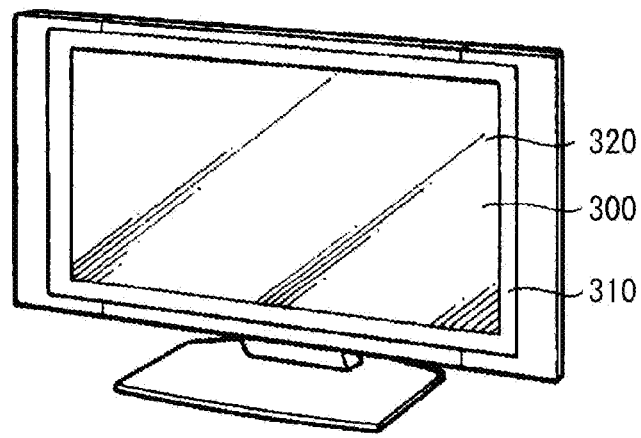
[FIG. 18A]
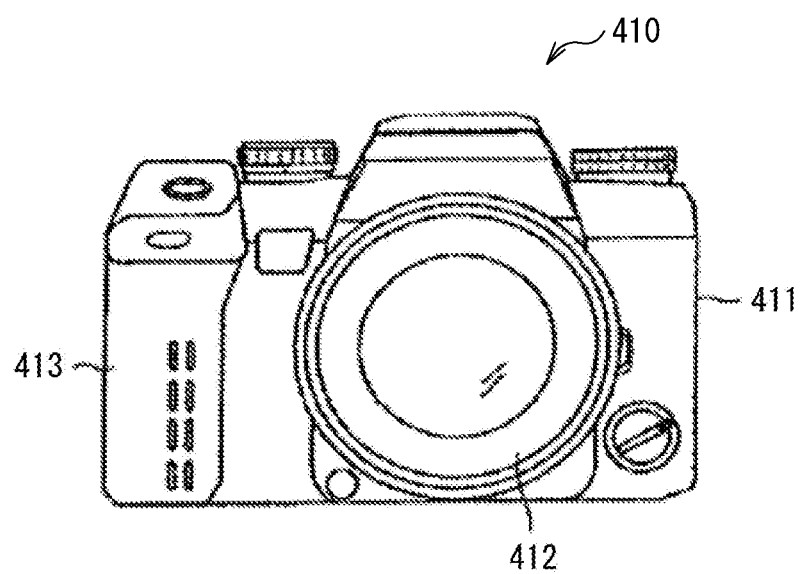

[FIG. 18B]
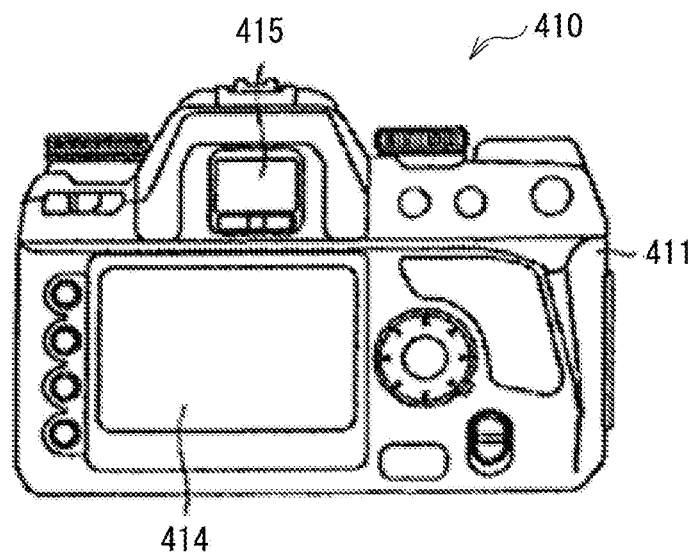
[FIG. 19]
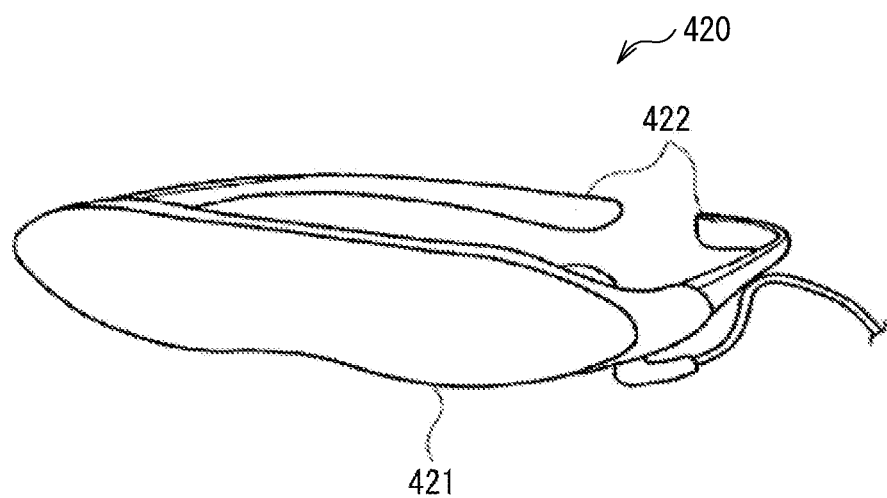

LIQUID CRYSTAL DISPLAY DEVICE AND ELECTRONIC APPARATUS

CROSS REFERENCE TO RELATED APPLICATIONS

This application is a U.S. National Phase of International Patent Application No. PCT/JP2019/011488 filed on Mar. 19, 2019, which claims priority benefit of Japanese Patent Application No. JP 2018-078535 filed in the Japan Patent Office on Apr. 16, 2018. Each of the above-referenced applications is hereby incorporated herein by reference in its entirety.

TECHNICAL FIELD

The present disclosure relates to a liquid crystal display device including a liquid crystal layer between a pair of electrodes, and to an electronic apparatus that includes such a liquid crystal display device.

BACKGROUND ART

A liquid crystal display device includes, for example, a liquid crystal layer between a pixel electrode and a counter electrode (for example, PTLs 1 and 2). The liquid crystal display device is applicable to an electronic apparatus such as a projection display, for example.

CITATION LIST

Patent Literature

PTL 1: Japanese Unexamined Patent Application Publication No. H04-97226
PTL 2: Japanese Unexamined Patent Application Publication No. 2001-311936

SUMMARY OF THE INVENTION

In such a liquid crystal display device, it is desired to reduce deterioration in image integrity. It is therefore desirable to provide a liquid crystal display device and an electronic apparatus that allow for reduction of deterioration in the image integrity.

A liquid crystal display device according to an embodiment of the present disclosure includes: a plurality of pixels each of which includes a first electrode, a second electrode opposed to the first electrode, and a liquid crystal layer between the second electrode and the first electrode; a first region that is provided in each of the plurality of pixels, and has a first optical path length between the first electrode and the second electrode; a second region that is provided in each of the plurality of pixels, and has a second optical path length between the first electrode and the second electrode, the second optical path length being shorter than the first optical path length, the second region being provided with the liquid crystal layer equal in thickness to the liquid crystal layer in the first region; and an optical path length adjusting layer that is provided between the liquid crystal layer and the first electrode in the first region, and fills a difference in level between the first electrode in the second region and the first electrode in the first region.

An electronic apparatus according to an embodiment of the present disclosure includes the above-described liquid crystal display device according to the embodiment of the present disclosure.

In the liquid crystal display device and the electronic apparatus according to the respective embodiments of the present disclosure, the optical path length adjusting layer is provided in the first region, which makes the first optical path length of the first region longer than the second optical path length of the second region.

According to the liquid crystal display device and the electronic apparatus of the respective embodiments of the present disclosure, each of the pixels is provided with the first region and the second region that are different in an optical path length between the first electrode and the second electrode from each other, which makes it possible to reduce generation of interference fringes. This allows for reduction of deterioration in the image integrity.

It is to be noted that effects described above are not necessarily limitative, and any of effects described in the present disclosure may be provided.

BRIEF DESCRIPTION OF DRAWINGS

FIG. 1 is a functional block diagram illustrating a configuration of a liquid crystal display device according to an embodiment of the present disclosure.
FIG. 2 is a diagram illustrating an example of a circuit configuration of a pixel illustrated in FIG. 1.
FIG. 3 is a cross-sectional schematic diagram illustrating a configuration of a main part of the liquid crystal display device illustrated in FIG. 1.
FIG. 4 is a schematic diagram illustrating an example of a planar configuration of a first region and a second region that are illustrated in FIG. 3.
FIG. 5 is a schematic diagram illustrating another example (1) of a planar configuration of a first region and a second region that are illustrated in FIG. 4.
FIG. 6 is a schematic diagram illustrating another example (2) of the planar configuration of the first region and the second region that are illustrated in FIG. 4.
FIG. 7 is a schematic diagram illustrating another example (3) of the planar configuration of the first region and the second region that are illustrated in FIG. 4.
FIG. 8 is a cross-sectional schematic diagram illustrating another example of an optical path length adjusting layer illustrated in FIG. 3.
FIG. 9 is a cross-sectional schematic diagram illustrating a configuration of a main part of a liquid crystal display device according to a comparative example.
FIG. 10 is a diagram illustrating a spectrum of light to be extracted from the liquid crystal display device illustrated in FIG. 3 or the like.
FIG. 11 is a cross-sectional schematic diagram illustrating a configuration of a main part of a liquid crystal display device according to a modification example 1.
FIG. 12 is a schematic diagram illustrating an example of a planar configuration of a first region and a second region that are illustrated in FIG. 11.
FIG. 13 is a cross-sectional schematic diagram illustrating a configuration of a main part of a liquid crystal display device according to a modification example 2.
FIG. 14 is a cross-sectional schematic diagram illustrating a configuration of a main part of a liquid crystal display device according to a modification example 3.
FIG. 15 is a diagram illustrating an example of a configuration of an electronic apparatus (a projection display) according to an application example (1).
FIG. 16 is an exploded perspective view illustrating an example of a liquid crystal display unit illustrated in FIG. 15.

FIG. 17 is a diagram illustrating an example of a configuration of an electronic apparatus (a television apparatus) according to an application example (2).

FIG. 18A is a front-view diagram illustrating an example of a configuration of an electronic apparatus (a digital single-lens reflex camera) according to an application example (3).

FIG. 18B is a rear-view diagram illustrating a configuration of the digital single-lens reflex camera illustrated in FIG. 18A.

FIG. 19 is a perspective diagram illustrating an example of a configuration of an electronic apparatus (a head-mounted display) according to an application example (4).

MODES FOR CARRYING OUT THE INVENTION

Hereinafter, some embodiments of the present disclosure are described in detail with reference to the drawings. It is to be noted that descriptions are given in the following order.
1. Embodiment (an example of a liquid crystal display device having an optical path length adjusting layer in a first region)
2. Modification Example 1 (an example of having an optical path length adjusting layer on a counter substrate side)
3. Modification Example 2 (an example where an optical path length adjusting layer has a curved cross-sectional shape)
4. Modification Example 3 (an example of a reflective liquid crystal display device)
5. Application Examples (electronic apparatuses)

1. EMBODIMENT

[Configuration]

FIG. 1 is a functional block diagram illustrating a whole configuration of a liquid crystal display device (a liquid crystal display device 10) according to an embodiment of the present disclosure. As described later, the liquid crystal display device 10 is to be used in, for example, a projection display such as a projector, and includes a transmissive liquid crystal display device such as an HTPS (High Temperature Poly-Silicon), for example. The liquid crystal display device 10 includes a display region (an effective pixel region) 10a having a plurality of pixels P, a scan line driving circuit 110 and a signal line driving circuit 120 that are disposed on the periphery of the display region 10a, as well as a plurality of scan lines GL and a plurality of signal lines DL. It is to be noted that, in addition to these, there are also provided a timing controller, and an image signal processor that performs various signal processing, both of which are unillustrated.

The signal line driving circuit 120 provides image signals based on the image signals to the plurality of pixels P in sequence in a horizontal direction through the plurality of signal lines DL disposed in parallel along the horizontal direction. The scan line driving circuit 110 provides gate signals (scan signals) to the plurality of pixels P in sequence in a vertical direction through the plurality of scan lines GL disposed in parallel along the vertical direction.

The plurality of pixels P is disposed at a position corresponding to each of intersection points of the plurality of signal lines DL and the plurality of scan lines GL, and is disposed two-dimensionally in a matrix form as a whole.

FIG. 2 illustrates a circuit configuration of the pixel P. The pixel P includes, for example, a liquid crystal element LC, an auxiliary capacitor Cs, and a TFT (Thin-Film Transistor) 12. One end (a pixel electrode 13 to be described later) of the liquid crystal element LC is coupled to a drain of the TFT 12 and one end of the auxiliary capacitor Cs, and another end (a counter electrode 17 to be described later) thereof is grounded, for example. The auxiliary capacitor Cs is a capacitor intended to stabilize stored charges of the liquid crystal element LC. The one end of the auxiliary capacitor Cs is coupled to the one end of the liquid crystal element LC and the drain of the TFT 12, and another end thereof is coupled to an auxiliary capacitor line CL. A gate and a source of the TFT 12 are respectively coupled to the scan line GL and the signal line DL, and the drain thereof is coupled to the one end of the liquid crystal element LC and the one end of the auxiliary capacitor Cs.

The liquid crystal element LC varies in light transmission rate depending on an image voltage to be provided on the one end thereof through the TFT 12 from the signal line DL. The TFT 12 is a switching element to provide an image voltage based on an image signal to the one end of each of the liquid crystal element LC and the auxiliary capacitor Cs, and includes, for example, a MOS-FET (Metal Oxide Semiconductor-Field Effect Transistor).

FIG. 3 is a cross-sectional view illustrating a configuration of a main part of the liquid crystal display device 10. FIG. 3 illustrates element structures of two pixels P. The liquid crystal display device 10 includes a plurality of pixels (the pixels P) each of which includes a liquid crystal element (the liquid crystal element LC illustrated in FIG. 2). Specifically, the liquid crystal display device 10 is provided with a pixel electrode 13 for each of the pixels P on a drive substrate 11 including the TFT 12. The pixel electrode 13 is electrically coupled to the TFT 12, and an alignment film 15A is formed on the pixel electrode 13. The liquid crystal display device 10 includes a counter substrate 19 opposed to the drive substrate 11. On a surface of the counter substrate 19 opposed to the drive substrate 11, a counter electrode 17 is provided across all the pixels P, and an alignment film 15B is formed to cover a surface of the counter electrode 17. A liquid crystal layer 16 is sealed between the alignment film 15A and the alignment film 15B. A lens 18 is provided for each of the pixels P between the counter substrate 19 and the counter electrode 17. The lens 18 includes, for example, a microlens.

Each of the drive substrate 11 and the counter substrate 19 includes a transparent substrate having light transmissive property, such as quartz or glass. Each of the pixel electrode 13 and the counter electrode 17 includes a transparent electrically-conductive film such as an ITO (indium tin oxide) with a thickness of about 140 nm, for example. Each of the alignment films 15A and 15B includes an insulating film such as, for example, silicon oxide ($SiO_2$). The alignment films 15A and 15B are formed by, for example, oblique vapor deposition, and are each about 200 nm in thickness. The alignment films 15A and 15B may include organic insulating materials. The liquid crystal layer 16 uses a liquid crystal of, for example, a vertical alignment type (a VA (Vertical Alignment) mode). In the liquid crystal of the VA mode, so-called pretilt is imparted to liquid crystal molecules to improve responsive characteristics to an applied voltage. An angle of the pretilt is 85 degrees assuming that a horizontal direction is 0 degree, for example. Refractive index anisotropy (Δn) of a constituent liquid crystal material for the liquid crystal layer 16 is, for example, 0.13, and dielectric constant anisotropy thereof is, for example, −3.5. The liquid crystal layer 16 has a thickness (a cell gap) of, for example, 2.7 μm. Depending on the intended use, the liquid crystal layer 16 may use any other liquid crystal modes, such as a TN (Twisted Nematic) mode, an ECB (Electrically controlled birefringence) mode, an FFS (Fringe Field Switching) mode, or an IPS (In Plane Switching) mode, for example.

In the present embodiment, for each of the pixels P, there are provided regions (a first region R1 and a second region R2) that are different in an optical path length between the pixel electrode 13 and the counter electrode 17 from each other. The first region R1 is a region having an optical path length D1 (a first optical path length) between the pixel electrode 13 and the counter electrode 17, and the second region R2 is a region having an optical path length D2 (a second optical path length) that is shorter than the optical path length D1 between the pixel electrode 13 and the counter electrode 17. An optical path length adjusting layer 14 is provided between the pixel electrode 13 and the alignment film 15A in the first region R1 out of the first region R1 and the second region R2. In the liquid crystal display device 10, mutual cancellation of optical interferences arises macroscopically between the first region R1 and the second region R2 that have different optical path lengths (the optical path lengths D1 and D2), which reduces generation of interference fringes.

FIG. 4 illustrates an example of a planar configuration of the first region R1 and the second region R2. FIG. 4 illustrates nine pixels P. For example, a cross-sectional configuration taken along a line III-III' in FIG. 4 corresponds to FIG. 3. The pixel P is a square with a side length of, for example, about 8.5 µm. The first region R1 is provided in a quadrangular shape in a middle portion of each of the pixels P, and the second region R2 is provided in a frame-like shape in each of the pixels P to surround a periphery of the first region R1. Preferably, the area of the first region R1 and the area of the second region R2 are substantially equal to each other; however, these areas may be different from each other. Making the area of the first region R1 and the area of the second region R2 substantially equal to each other improves the effect of mutual cancellation of the optical interferences between the first region R1 and the second region R2.

FIG. 5, FIG. 6, and FIG. 7 illustrate other examples of the planar configuration of the first region R1 and the second region R2. For example, a planar shape of the first region R1 may be any shape other than a quadrangle, and may be, for example, circular (FIG. 5). The first region R1 and the second region R2 may be disposed in a checkered pattern (FIG. 6). The first region R1 and the second region R2 may each have a triangular planar shape, and may be disposed on opposing corners of a single pixel P (FIG. 7). The first regions R1 may be provided to be coupled between the pixels P adjacent to each other in a row direction or a column direction (FIG. 12 to be described later).

As described above, the first region R1 and the second region R2 have the optical path lengths D1 and D2 respectively between the pixel electrode 13 and the counter electrode 17 (FIG. 3). A difference between the optical path length D1 and the optical path length D2 is preferably ¼ of a wavelength λ of light that enters the liquid crystal layer 16. In other words, the difference between the optical path length D1 and the optical path length D2 is preferably 1/(2π) (π is a frequency of light that enters the liquid crystal layer 16). For example, when light at a blue wavelength band of 455 nm enters the liquid crystal layer 16, the difference between the optical path length D1 and the optical path length D2 is preferably 455×¼=113.75 nm or so. To the extent that the effects of the present disclosure are exhibited, the difference between the optical path length D1 and the optical path length D2 may differ from ¼ of the wavelength λ of the light that enters the liquid crystal layer 16.

In the liquid crystal display device 10, of the first region R1 and the second region R2, the first region R1 is selectively provided with the optical path length adjusting layer 14, which makes the optical path length D1 of the first region R1 longer than the optical path length D2 of the second region R2. As will hereinafter be described in detail, the optical path length adjusting layer 14 provided in the first region R1 in such a manner serves to reduce a difference in level between the first region R1 and the second region R2 that is caused by a difference in the optical path length. This allows thicknesses of the liquid crystal layer 16 in the first region R1 and the second region R2 to be substantially equal to each other.

The optical path length adjusting layer 14 serves to adjust the optical path length D1 of the first region R1, and is provided between the liquid crystal layer 16 and the pixel electrode 13, more specifically, between the alignment film 15A and the pixel electrode 13. The optical path length adjusting layer 14 serves to fill a difference in level between the pixel electrode 13 in the first region R1 and the pixel electrode 13 in the second region R2, and is embedded in a recessed portion of the drive substrate 11 that is provided in the first region R1, for example. The optical path length adjusting layer 14 has a refractive index substantially equal to a refractive index of the alignment film 15A. The optical path length adjusting layer 14 includes, for example, silicon oxide ($SiO_2$) or the like. The optical path length adjusting layer 14 may include either an inorganic material or an organic material. The optical path length D1 is adjusted by the refractive index and thickness of the optical path length adjusting layer 14. For example, in a case where the optical path length adjusting layer 14 includes silicon oxide (a refractive index of 1.465), and the difference between the optical path length D1 and the optical path length D2 is 455×¼=113.75 nm or so, the thickness (a dimension in a Z direction in FIG. 3) of the optical path length adjusting layer 14 is about 77.6 nm.

Providing the optical path length adjusting layer 14 with such a predetermined thickness in the first region R1 fills a difference in level between a surface of the pixel electrode 13 in the first region R1 and a surface of the pixel electrode 13 in the second region R2. As a result, a surface of the optical path length adjusting layer 14 in the first region R1 and the surface of the pixel electrode 13 in the second region R2 become the same in level, and the alignment film 15A is thus provided on a planarized surface. This suppresses the creation of a difference in level of the liquid crystal layer 16 between the first region R1 and the second region R2, and thicknesses of the liquid crystal layer 16 in the first region R1 and the second region R2 become substantially equal to each other.

FIG. 8 illustrates another example of a cross-sectional shape of the optical path length adjusting layer 14. The optical path length adjusting layer 14 has a quadrangular, such as rectangular cross-sectional shape, for example (FIG. 3). The optical path length adjusting layer 14 may have a tapered cross-sectional shape (FIG. 8). A planar shape of the optical path length adjusting layer 14 is the same as the planar shape of the first region R1 (see FIG. 4 to FIG. 7).

The optical path length adjusting layer 14 is formed in the following manner, for example. Initially, a film of silicon oxide or the like is formed on the pixel electrode 13 in the first region R1 by an HDP-CVD (High Density Plasma Chemical Vapor Deposition) method or the like. Thereafter, the resulting silicon oxide film or the like is planarized by, for example, CMP (Chemical Mechanical Polishing). This results in formation of the optical path length adjusting layer 14.

[Operation]

In the liquid crystal display device 10, on the basis of an image signal inputted externally, the scan line driving circuit 110 selects the pixels P in a line-sequential manner, and the signal line driving circuit 120 supplies an image voltage corresponding to the image signal to each of the pixels P. This causes the pixels P to be display-driven to achieve image display (FIG. 1).

[Workings and Effects]

In the present embodiment, each of the pixels P is provided with the first region R1 and the second region R2 that are different in optical path lengths (the optical path lengths D1 and D2) between the pixel electrode 13 and the counter electrode 17 from each other. This reduces generation of interference fringes. Further, the optical path length adjusting layer 14 is provided selectively in the first region R1 having the longer optical path length D1. This suppresses creation of a difference in level between the first region R1 and the second region R2. Hereinafter, description is provided of such workings and effects.

For example, the liquid crystal display device is applicable to a projector and the like. In such a case, a laser diode (LD) or the like is used as a light source. Light emitted from the laser diode is single-wavelength light, and coherent light as well. In such a manner, when a light source that causes a steep spectrum peak of emitted light is used, interference fringes due to unevenness of a thickness (a cell gap) of a liquid crystal layer are likely to be generated. The interference fringes appear in a ring form on a display screen to deteriorate an image quality significantly.

To reduce generation of the interference fringes, a method of reducing interfacial reflection of a transparent electrode may be considered. For example, an adjustment of a thickness of the transparent electrode makes it possible to reduce the interfacial reflection of the transparent electrode. However, such a method involves adjusting the thickness of the transparent electrode for each of colors R (red), G (green), and B (blue), resulting in low productivity. As an alternative, it is also possible to reduce the interfacial reflection of the transparent electrode by performing antireflection coating with use of a multilayer film; however, in such a case, it is difficult to control variations in a film thickness of the multilayer film. Meanwhile, a method is also proposed that cancels an interference spectrum by varying a thickness of a liquid crystal layer within a single pixel.

FIG. 9 illustrates a schematic cross-sectional configuration of a main part of a liquid crystal display device (a liquid crystal display device 100) according to a comparative example. In the liquid crystal display device 100, a first region R101 and a second region R102 are provided for each of the pixels P. The first region R101 is a region having a liquid crystal layer 16 with a thickness T1, and the second region R102 is a region having the liquid crystal layer 16 with a thickness T2 that is smaller than the thickness T1. Any interference spectrum is cancelled macroscopically by providing such first region R101 and second region R102 that are different in thickness (the thicknesses T1 and T2) of the liquid crystal layer 16 from each other, which makes it possible to reduce generation of the interference fringes. However, in the liquid crystal display device 100, a difference in level of the liquid crystal layer 16 is formed between the first region R101 and the second region R102. The difference in level of the liquid crystal layer 16 causes liquid crystal alignment to be disturbed, which can result in deterioration in image quality, degradation of a contrast ratio, or the like.

In contrast, in the liquid crystal display device 10, the optical path length D1 of the first region R1 is made longer than the optical path length D2 of the second region R2 by providing the optical path length adjusting layer 14 with a predetermined thickness between the pixel electrode 13 and the alignment film 15A in the first region R1. This makes it possible to suppress creation of a difference in level of the liquid crystal layer 16 between the first region R1 and the second region R2, while providing the first region R1 and the second region R2 that are different in the optical path length (the optical path lengths D1 and D2) in each of the pixels P. Consequently, it is possible to suppress generation of the interference fringes and also suppress deterioration in the image quality and degradation of the contrast ratio that are caused by the disturbed alignment of the liquid crystal layer 16.

FIG. 10 illustrates a spectrum of light extracted from each of the first region R1 and the second region R2, and average light of such light. As illustrated, it is confirmed that the light extracted from each of the first region R1 and the second region R2 macroscopically cancels optical interferences with each other.

As described above, in the liquid crystal display device 10 of the present embodiment, for each of the pixels P, the first region R1 and the second region R2 are provided that are different in the optical path length between the pixel electrode 13 and the counter electrode 17 from each other, which makes it possible to suppress generation of the interference fringes. Consequently, it is possible to reduce deterioration in image integrity.

Hereinafter, description is provided of modification examples of the above-described embodiment. It is to be noted that any components similar to those in the above-described embodiment are denoted with the same reference numerals, and the related descriptions are omitted as appropriate.

Modification Example 1

FIG. 11 illustrates a schematic cross-sectional configuration of a main part of a liquid crystal display device (a liquid crystal display device 10A) according to a modification example 1 of the above-described embodiment. In the liquid crystal display device 10A, the optical path length adjusting layer 14 is provided on the counter substrate 19 side of the first region R1. With the exception of this point, the liquid crystal display device 10A has a configuration similar to that of the liquid crystal display device 10 described in the above embodiment, and the workings and effects thereof are also similar to those of the liquid crystal display device 10.

The optical path length adjusting layer 14 is provided between the alignment film 15B and the counter electrode 17 in the first region R1. As with the above-described embodiment, in the first region R1 in which the optical path length adjusting layer 14 is provided, the optical path length D1 between the pixel electrode 13 and the counter electrode 17 is longer than the optical path length D2 between the pixel electrode 13 and the counter electrode 17 in the second region R2 by ¼ of a wavelength $\lambda$ of light that enters the liquid crystal layer 16.

FIG. 12 illustrates an example of a planar configuration of the first region R1 and the second region R2. For example, a cross-sectional configuration taken along a line XI-XI' in FIG. 12 corresponds to FIG. 11. The first region R1 (the optical path length adjusting layer 14) is provided in a rectangular shape on one side in a column direction (Y direction in FIG. 12) of each of the pixels P, for example. The first regions R1 are coupled across the plurality of pixels P adjacent to each other in a row direction (X direction in FIG. 12), and are provided in a band shape. The first regions R1 may be disposed adjacently between two pixels P adjoining in the column direction (the Y direction in FIG. 12). The first regions R1 may be disposed in a band shape along the column direction (unillustrated).

As an alternative, as illustrated in FIG. 4 and FIG. 5, the first region R1 of a quadrangular or circular form, or any other form may be provided in the middle portion of each of the pixels P. As illustrated in FIG. 6, the first region R1 and the second region R2 may be disposed in a checkered pattern. The first region R1 and the second region R2 may each have a triangular planar shape, and may be disposed on opposing corners of a single pixel P (FIG. 7).

A cover layer 21 may be provided between the counter electrode 17 and the lens 18 (FIG. 11). The cover layer 21 serves to adjust a focal length of the lens 18. The cover layer 21 includes a silicon oxide film formed by, for example, a plasma CVD (Chemical Vapor Deposition) method.

As with the liquid crystal display device 10 of the above-described embodiment, the liquid crystal display device 10A of the present modification example is also provided with, for each of the pixels P, the first region R1 and the second region R2 that are different in the optical path length between the pixel electrode 13 and the counter electrode 17 from each other. This makes it possible to suppress generation of the interference fringes. Consequently, it is possible to suppress deterioration in the image integrity. Further, on the counter substrate 19 side, it is easier to freely dispose the optical path length adjusting layer 14 than on the drive substrate 11 side. This allows the liquid crystal display device 10A to provide a higher degree of freedom in design of the first region R1 and the second region R2.

Modification Example 2

FIG. 13 illustrates a schematic cross-sectional configuration of a main part of a liquid crystal display device (a liquid crystal display device 10B) according to a modification example 2 of the above-described embodiment. The optical path length adjusting layer 14 of the liquid crystal display device 10B has a curved cross-sectional shape. With the exception of this point, the liquid crystal display device 10B has a configuration similar to that of the liquid crystal display device 10 described in the above embodiment, and the workings and effects thereof are also similar to those of the liquid crystal display device 10.

For example, as with the above-described modification example 1, the optical path length adjusting layer 14 is provided between the alignment film 15B and the counter electrode 17 in the first region R1. The optical path length adjusting layer 14 may be provided between the pixel electrode 13 and the alignment film 15A in the first region R1, that is, on the drive substrate 11 side. As with the above-described embodiment, in the first region R1 in which the optical path length adjusting layer 14 is provided, the optical path length D1 between the pixel electrode 13 and the counter electrode 17 is longer than the optical path length D2 between the pixel electrode 13 and the counter electrode 17 in the second region R2 by ¼ of a wavelength λ of light that enters the liquid crystal layer 16.

In the first region R1, the thickness of the optical path length adjusting layer 14 becomes greater gradually as a position in the X direction or the Y direction varies, and becomes smaller gradually after reaching a maximum value at a certain position. The optical path length adjusting layer 14 may be provided in the second region R2. In the second region R2, the thickness of the optical path length adjusting layer 14 becomes smaller gradually as the position in the X direction or the Y direction varies, and becomes greater gradually after reaching a minimum value at a certain position. In other words, the thickness of the optical path length adjusting layer 14 varies in each of the first region R1 and the second region R2. For example, the optical path length D1 of the first region R1 is adjusted by the maximum thickness of the optical path length adjusting layer 14, and the optical path length D2 of the second region R2 is adjusted by the minimum thickness of the optical path length adjusting layer 14. In such a manner, the thickness of the optical path length adjusting layer 14 may be gradually varied from the first region R1 to the second region R2, or from the second region R2 to the first region R1. It is sufficient that a cycle of variation in the thickness of the optical path length adjusting layer 14 is adjusted within a pitch of the pixel P.

The optical path length adjusting layer 14 has, for example, a cubic shape protruding in a circular form. As an alternative, the optical path length adjusting layer 14 may have a corrugated plate-like shape.

As with the liquid crystal display device 10 of the above-described embodiment, the liquid crystal display device 10B of the present modification example is also provided with, for each of the pixels P, the first region R1 and the second region R2 that are different in the optical path length between the pixel electrode 13 and the counter electrode 17 from each other. This makes it possible to suppress generation of the interference fringes. Consequently, it is possible to suppress deterioration in the image integrity.

Modification Example 3

FIG. 14 illustrates a schematic cross-sectional configuration of a main part of a liquid crystal display device (a liquid crystal display device 10C) according to a modification example 2 of the above-described embodiment. The liquid crystal display device 10C includes a reflective liquid crystal display device, such as LCOS (Liquid Crystal On Silicon), for example. With the exception of this point, the liquid crystal display device 10C has a configuration similar to that of the liquid crystal display device 10 described in the above embodiment, and the workings and effects thereof are also similar to those of the liquid crystal display device 10.

In the liquid crystal display device 10C, for example, the pixel electrode 13 includes an electrically-conductive film having high reflectance, and the counter electrode 17 includes an electrically-conductive film having high light transmissive property. For example, the pixel electrode 13 includes an aluminum (Al) film or the like with a thickness of about 80 nm. The counter electrode 17 includes ITO or the like with a thickness of about 15 nm. For the liquid crystal layer 16, for example, a liquid crystal of a vertical alignment type (a VA mode) is used. A pretilt angle is 85 degrees, for example. A birefringence index (Δn) of the liquid crystal layer 16 is, for example, 0.11, and a thickness (a cell gap) of the liquid crystal layer 16 is, for example, 1.6 μm.

Each of the alignment films 15A and 15B includes, for example, an insulating film such as silicon oxide ($SiO_2$). The alignment films 15A and 15B are formed by, for example, oblique vapor deposition, and are each about 120 nm in thickness.

A low refractive-index film 22 and a high refractive-index film 23 are provided between the pixel electrode 13 and the alignment film 15A. The low refractive-index film 22 that is provided between the pixel electrode 13 and the high refractive-index film 23 includes, for example, silicon oxide ($SiO_2$) with a thickness of about 36 nm, or the like. The high refractive-index film 23 that is provided between the low refractive-index film 22 and the alignment film 15A includes, for example, silicon nitride (SiN) with a thickness of about 70 nm, or the like. Such low refractive-index film 22 and high refractive-index film 23 function as reflection enhancing films that increase reflection efficiency in the pixel electrode 13.

The optical path length adjusting layer 14 is provided between the pixel electrode 13 and the low refractive-index film 22 in the first region R1. Preferably, the optical path length adjusting layer 14 has substantially the same refractive index as the refractive index of the low refractive-index film 22, and includes the same material as a constituent material of the low refractive-index film 22. The optical path length adjusting layer 14 includes, for example, silicon oxide ($SiO_2$) or the like. As with the above-described embodiment, in the first region R1 in which the optical path length adjusting layer 14 is provided, the optical path length D1 between the pixel electrode 13 and the counter electrode 17 is longer than the optical path length D2 between the pixel electrode 13 and the counter electrode 17 in the second region R2 by ¼ of a wavelength λ of light that enters the liquid crystal layer 16.

As with the above-described modification example 1, the optical path length adjusting layer 14 may be provided on the counter substrate 19 side. The optical path length adjusting layer 14 has a quadrangular, such as rectangular cross-sectional shape, for example (FIG. 14). The optical path length adjusting layer 14 may have a tapered cross-sectional shape (FIG. 8). As described in the above embodiment, the planar shape of the optical path length adjusting layer 14 is the same as the planar shape of the first region R1 (see FIG. 4 to FIG. 7). The pixel P is a square with a side length of, for example, about 4 µm.

As with the liquid crystal display device 10 of the above-described embodiment, the liquid crystal display device 10C of the present modification example is also provided with, for each of the pixels P, the first region R1 and the second region R2 that are different in the optical path length between the pixel electrode 13 and the counter electrode 17 from each other. This make it possible to suppress generation of the interference fringes. Consequently, it is possible to reduce deterioration in the image integrity.

Application Examples

Any of the liquid crystal display devices 10, 10A, 10B, and 10C of the above-described embodiment and the like (hereinafter referred to as the liquid crystal display device 10 for short) is applicable to all types of displays (electrical apparatuses) including projection types or direct-viewing types. As an example, FIG. 15 illustrates a simplified configuration of a projection display (a projection display 1). In the projection display 1, the liquid crystal display device 10 of the above-described embodiment and the like is built in liquid crystal display units (liquid crystal display units 10UR, 10UG, and 10UB). The projection display 1 is of a so-called three-plate method that performs color image display using three plates of transmissive liquid crystal display units 10UR, 10UG, and 10UB. The projection display 1 includes a light source 211, a pair of first and second multilens array integrators 212 and 213, and a total reflection mirror 214. In the multilens array integrators 212 and 213, a plurality of microlenses 212M and a plurality of microlenses 213M are respectively arranged two-dimensionally. The multilens array integrators 212 and 213 serve to uniformize an illuminance distribution of light, and have a function to divide entering light into a plurality of small light fluxes.

The light source 211 emits white light including red light, blue light, and green light that are necessary for color image display. The light source 211 includes, for example, a light emitter (unillustrated) that emits the white light, and a concave mirror that reflects and collects the light emitted from the light emitter. Examples of the light emitter include a halogen lamp, a metal halide lamp, a xenon lamp, or the like. The concave mirror preferably has a shape ensuring high light-collecting efficiency, and is, for example, a spheroid mirror, a rotating parabolic mirror or the like having a rotationally symmetric surface shape. The light source 211 may include a laser light source, a fluorescent light source, an LED (Light-Emitting Diode) light source, or the like.

The projection display 1 further includes a PS synthesizing element 215, a condenser lens 216, and a dichroic mirror 217 in this order on a light output side of the second multilens array integrator 213. The dichroic mirror 217 has a function to separate entering light into, for example, red light LR and other color light.

The PS synthesizing element 215 is provided with a plurality of half-wave plates 215A at positions corresponding to locations between the adjacent microlenses on the second multilens array integrator 213. The PS synthesizing element 215 has a function to separate entering light L0 into polarized light L1 and L2 of two types (P-polarized component and S-polarized component). Further, the PS synthesizing element 15 has a function to output one of the two types of separated polarized light L1 and L2, i.e., the polarized light L2, from the PS synthesizing element 215 while maintaining a polarization direction (for example, P polarization) of the polarized light L2, and to convert the other polarized light L1 (for example, S-polarized component) into another polarized component (for example, P-polarized component) through the action of the half-wave plate 215A and output the converted polarized light.

In addition, the projection display 1 includes a total reflection mirror 218, a field lens 224R, and the liquid crystal display unit 10UR in this order along an optical path of the red light LR separated by the dichroic mirror 217. The total reflection mirror 218 reflects the red light LR separated by the dichroic mirror 217 toward the liquid crystal display unit 10UR. The liquid crystal display unit 10UR has a function to spatially modulate the red light LR entering through the field lens 224R on the basis of an image signal.

The projection display 1 further includes a dichroic mirror 219 along an optical path of other color light separated by the dichroic mirror 217. The dichroic mirror 219 has a function to separate entering light into green light and blue light, for example.

In addition, the projection display 1 includes a field lens 224G and the liquid crystal display unit 10UG in this order along an optical path of green light LG separated by the dichroic mirror 219. The liquid crystal display unit 10UG has a function to spatially modulate the green light LG entering through the field lens 224G on the basis of the image signal. Further, the projection display 1 includes a relay lens 220, a total reflection mirror 221, a relay lens 222, a total reflection mirror 223, a field lens 224B, and the liquid crystal display unit 10UB in this order along an optical path of blue light LB separated by the dichroic mirror 219. The total reflection mirror 221 reflects the blue light LB entering through the relay lens 220 toward the total reflection mirror 223. The total reflection mirror 223 reflects the blue light LB reflected by the total reflection mirror 221 and entering through the relay lens 222 toward the liquid crystal display unit 10UB. The liquid crystal display unit 10UB has a function to spatially modulate the blue light LB reflected by the total reflection mirror 223 and entering through the field lens 224B on the basis of the image signal.

The projection display 1 also includes a cross prism 226 having a function to synthesize the red light LR, the green light LG, and the blue light LB at a position where the optical paths of these three types of color light intersect with each other. In addition, the projection display 1 includes a projection lens 227 for projecting synthesized light outputted from the cross prism 226 toward a screen 228. The cross prism 226 has three light entrance surfaces 226R, 226G, and 226B, and a single output surface 226T. The red light LR outputted from the liquid crystal display unit 10UR enters the light entrance surface 226R; the green light LG outputted from the liquid crystal display unit 10UG enters the light entrance surface 226G; and the blue light LB outputted from the liquid crystal display unit 10UB enters the light entrance surface 226B. The cross prism 226 synthesizes the three types of color light that enter the light entrance surfaces 226R, 226G, and 226G, and outputs the synthesized light from the output surface 226T.

FIG. 16 illustrates an exploded view of a main part of each of the liquid crystal display units 10UR, 10UG, and 10UB. The liquid crystal display units 10UR, 10UG, and 10UB each include the liquid crystal display device 10, as well as an outer frame 151 and a parting plate 154 that house and hold the liquid crystal display device 10 therebetween.

A film substrate 155 is coupled to the liquid crystal display device 10, and image information necessary for modulation of entering light is supplied from a main body side of the projection display 1 through the film substrate 155. An entrance-side dustproof glass 153 is attached to the light entrance side of the liquid crystal display device 10, and an output-side dustproof glass 152 is attached to the light output side. The parting plate 154 is mounted on the light entrance side of the liquid crystal display device 10, and has an opening opposed to the display region 10a of the liquid crystal display device 10. The outer frame 151 is attached to the light output side of the liquid crystal display device 10, and has a frame shape surrounding end face portions of the liquid crystal display device 10.

The liquid crystal display device 10 of the above-described embodiment and the like is also applicable to electronic apparatuses such as a television apparatus, a digital camera, a notebook-sized personal computer, a mobile terminal including a mobile phone and a smartphone, or a video camera.

For example, FIG. 17 illustrates an external appearance of a television apparatus to which the liquid crystal display device 10 of the above-described embodiment and the like is applied. The television apparatus has, for example, an image display screen section 300 including a front panel 310 and a filter glass 320. The image display screen section 300 includes the liquid crystal display device 10 of the above-described embodiment and the like.

FIGS. 18A and 18B illustrate external appearances of a digital single-lens reflex camera 410. The digital single-lens reflex camera 410 includes, for example, a main body section 411, a lens 412, a grip 413, a display section 414, a viewfinder 415, and the like. The liquid crystal display device 10 of the above-described embodiment and the like is built in the display section 414 or the viewfinder 415.

FIG. 19 illustrates an external appearance of a head-mounted display 420. The head-mounted display 420 includes, for example, an eyeglasses-type display section 421 and a supporting section 422. The liquid crystal display device 10 of the above-described embodiment and the like is built in the display section 421.

The present disclosure is described thus far with reference to the embodiment and the modification examples; however, the present disclosure is not limited to such embodiment and the like, but various modifications may be made. For example, a material, a shape, a size, and the like of each of the components described in the above embodiment and the like are merely examples, and they are not limited to those described herein. Further, it is not necessary to provide all of the components, and any other components may be included.

Further, in the above embodiment and the like, description is provided of a case where the optical path length adjusting layer 14 is provided on either the drive substrate 11 side or the counter substrate 19 side; however, the optical path length adjusting layer 14 may be provided on both of the drive substrate 11 side and the counter substrate 19 side.

Additionally, in the above embodiment and the like, description is provided of a case where a single first region R1 and a single second region R2 are provided in a single pixel P; however, either or both of the numbers of the first region R1 and the second region R2 provided in a single pixel P may be two or more.

It is to be noted that the effects described in the present specification are merely examples, and any other effects may be achieved or any other effects may further be included.

For example, the present disclosure may be configured as follows.

(1)
A liquid crystal display device including:
a plurality of pixels each of which includes a first electrode, a second electrode opposed to the first electrode, and a liquid crystal layer between the second electrode and the first electrode;
a first region that is provided in each of the plurality of pixels, and has a first optical path length between the first electrode and the second electrode;
a second region that is provided in each of the plurality of pixels, and has a second optical path length between the first electrode and the second electrode, the second optical path length being shorter than the first optical path length, the second region being provided with the liquid crystal layer equal in thickness to the liquid crystal layer in the first region; and
an optical path length adjusting layer that is provided between the liquid crystal layer and the first electrode in the first region, and fills a difference in level between the first electrode in the second region and the first electrode in the first region.

(2)
The liquid crystal display device according to (1), in which a difference between the first optical path length and the second optical path length is ¼ of a wavelength λ of light that enters the liquid crystal layer.

(3)
The liquid crystal display device according to (1) or (2), further including an alignment film that is provided between the optical path length adjusting layer and the liquid crystal layer in the first region, and is provided between the first electrode and the liquid crystal layer in the second region, in which
the alignment film is provided on a planarized surface across the first region and the second region.

(4)
The liquid crystal display device according to any one of (1) to (3), further including a drive substrate and a counter substrate that are opposed to each other with the first electrode, the liquid crystal layer, and the second electrode interposed therebetween.

(5)
The liquid crystal display device according to (4), in which the first electrode, the liquid crystal layer, the second electrode, and the counter substrate are provided in this order on the drive substrate.

(6)
The liquid crystal display device according to (4), in which the second electrode, the liquid crystal layer, the first electrode, and the counter substrate are provided in this order on the drive substrate.

(7)
The liquid crystal display device according to any one of (1) to (6), in which an area of the first region and an area of the second region are equal to each other in each of the plurality of pixels.

(8)
The liquid crystal display device according to any one of (1) to (7), in which the first region is provided in a middle portion of each of the plurality of pixels.

(9)
The liquid crystal display device according to any one of (1) to (8), in which the plurality of pixels is disposed in a matrix form.

(10)
The liquid crystal display device according to (9), in which the first region is disposed in a band shape across the plurality of pixels.

(11)
The liquid crystal display device according to any one of (1) to (10), in which the optical path length adjusting layer has a quadrangular cross-sectional shape.

(12)
The liquid crystal display device according to any one of (1) to (10), in which the optical path length adjusting layer has a curved cross-sectional shape.

(13)
The liquid crystal display device according to any one of (1) to (12), in which the second region is provided with the optical path length adjusting layer having a thickness smaller than a thickness of the optical path length adjusting layer in the first region.

(14)
The liquid crystal display device according to any one of (1) to (13), in which the optical path length adjusting layer includes silicon oxide.

(15)
The liquid crystal display device according to any one of (1) to (14), in which the liquid crystal display device includes a transmissive liquid crystal display device.

(16)
The liquid crystal display device according to any one of (1) to (14), in which the liquid crystal display device includes a reflective liquid crystal display device.

(17)
The liquid crystal display device according to (16), further including a low refractive-index film and a high refractive-index film between the first electrode and the liquid crystal layer, in which
the optical path length adjusting layer is provided between the low refractive-index film and the first electrode in the first region.

(18)
An electronic apparatus including a liquid crystal display device, the liquid crystal display device including:
a plurality of pixels each of which includes a first electrode, a second electrode opposed to the first electrode, and a liquid crystal layer between the second electrode and the first electrode;
a first region that is provided in each of the plurality of pixels, and has a first optical path length between the first electrode and the second electrode;
a second region that is provided in each of the plurality of pixels, and has a second optical path length between the first electrode and the second electrode, the second optical path length being shorter than the first optical path length, the second region being provided with the liquid crystal layer equal in thickness to the liquid crystal layer in the first region; and
an optical path length adjusting layer that is provided between the liquid crystal layer and the first electrode in the first region, and fills a difference in level between the first electrode in the second region and the first electrode in the first region.

This application claims priority from Japanese Patent Application No. 2018-78535 filed on Apr. 16, 2018 with the Japan Patent Office, the entire contents of which are incorporated in this application by reference.

It should be understood by those skilled in the art that various modifications, combinations, sub-combinations, and alterations may occur depending on design requirements and other factors insofar as they are within the scope of the appended claims or the equivalents thereof.

The invention claimed is:
1. A liquid crystal display device, comprising:
a plurality of pixels, wherein each pixel of the plurality of pixels includes:
a first electrode;
a second electrode opposite to the first electrode;
a lens above the second electrode;
a cover layer in direct contact with the second electrode and the lens, wherein the cover layer is configured to adjust a focal length of the lens;
a liquid crystal layer between the second electrode and the first electrode;
a first region that has a first optical path length between the first electrode and the second electrode;
a second region that has a second optical path length between the first electrode and the second electrode, wherein
a thickness of the liquid crystal layer in the second region is equal to a thickness of the liquid crystal layer in the first region; and
an optical path length adjusting layer between the liquid crystal layer and the second electrode, wherein
a thickness of the optical path length adjusting layer varies in the first region and the second region, in the first region, the thickness of the optical path length adjusting layer increases to a maximum value at a first position and decreases after the first position, in the second region, the thickness of the optical path length adjusting layer decreases to a minimum value at a second position and increases after the second position, and the first optical path length in the first region is longer than the second optical path length in the second region.

2. The liquid crystal display device according to claim 1, wherein a difference between the first optical path length and the second optical path length is ¼ of a wavelength A of light that enters the liquid crystal layer.

3. The liquid crystal display device according to claim 1, further comprising an alignment film between the optical path length adjusting layer and the liquid crystal layer in the first region, and between the second electrode and the liquid crystal layer in the second region, wherein the alignment film is on a planarized surface across the first region and the second region.

4. The liquid crystal display device according to claim 1, further comprising:

a drive substrate; and a counter substrate opposite to the drive substrate, wherein the first electrode, the liquid crystal layer, and the second electrode are between the drive substrate and the counter substrate.

5. The liquid crystal display device according to claim 4, wherein the first electrode, the liquid crystal layer, the second electrode, and the counter substrate are in this order on the drive substrate.

6. The liquid crystal display device according to claim 1, wherein an area of the first region is equal to an area of the second region in each pixel of the plurality of pixels.

7. The liquid crystal display device according to claim 1, wherein the plurality of pixels is in a matrix form.

8. The liquid crystal display device according to claim 7, wherein the first region is in a band shape across the plurality of pixels.

9. The liquid crystal display device according to claim 1, wherein the optical path length adjusting layer has a curved cross-sectional shape.

10. The liquid crystal display device according to claim 1, wherein the thickness of the optical path length adjusting layer in the second region is smaller than the thickness of the optical path length adjusting layer in the first region.

11. The liquid crystal display device according to claim 1, wherein the optical path length adjusting layer includes silicon oxide.

12. The liquid crystal display device according to claim 1, wherein the liquid crystal display device comprises a transmissive liquid crystal display device.

13. An electronic apparatus, including:

a liquid crystal display device, the liquid crystal display device comprising:

a plurality of pixels, wherein each pixel of the plurality of pixels includes:

a first electrode;

a second electrode opposite to the first electrode;

a lens above the second electrode;

a cover layer in direct contact with the second electrode and the lens, wherein the cover layer is configured to adjust a focal length of the lens;

a liquid crystal layer between the second electrode and the first electrode;

a first region that has a first optical path length between the first electrode and the second electrode;

a second region that has a second optical path length between the first electrode and the second electrode, wherein a thickness of the liquid crystal layer in the second region equal to a thickness of the liquid crystal layer in the first region; and an optical path length adjusting layer between the liquid crystal layer and the second electrode, wherein a thickness of the optical path length adjusting layer varies in the first region and the second region, in the first region, the thickness of the optical path length adjusting layer increases to a maximum value at a first position and decreases after the first position, in the second region, the thickness of the optical path length adjusting layer decreases to a minimum value at a second position and increases after the second position, and the first optical path length in the first region is longer than the second optical path length in the second region.

* * * * *